P. & W. B. HAYDEN.
MODE OF PILING BESSEMER STEEL SCRAP.
No. 186,836.  Patented Jan. 30, 1877.
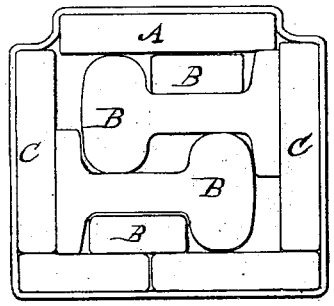

UNITED STATES PATENT OFFICE.

PETER HAYDEN, OF NEW YORK, N. Y., AND WILLIAM B. HAYDEN, OF COLUMBUS, OHIO.

IMPROVEMENT IN THE MODES OF PILING BESSEMER-STEEL SCRAP.

Specification forming part of Letters Patent No. 186,836, dated January 30, 1877; application filed October 13, 1876.

*To all whom it may concern:*

Be it known that we, PETER HAYDEN, of New York, N. Y., and WILLIAM B. HAYDEN, of Columbus, Ohio, have invented a new and useful Improvement in the Manufacture of Iron from Bessemer Steel and Muck-Bar Iron, which improvement is fully set forth in the following specification:

This improvement has reference to the manufacture of iron from Bessemer steel and muck-bar iron. It consists in piling Bessemer scrap-steel and muck-iron together, the steel being placed in the center and the iron on the outside of the steel, and completely surrounding it, in the proportion of from one-third to one-half of the Bessemer scrap-steel to that of the iron, and having the outside iron so arranged with respect to the Bessemer scrap-steel that it will follow down close onto the scrap-steel in the heating of the mass in the furnace preparatory to passing it through the rolls, so as to leave no air-passages through the mass, and in order that the mass shall be homogeneous and weld perfectly in its passages through the rolls.

It is well known that steel arrives at a welding heat before iron, owing to its greater fusibility, and that it is necessary, in welding the iron and steel together, to see that both arrive at the welding heat at the same instant. It therefore follows that the steel must be heated to a considerably less degree than the iron in order to insure a proper weld. There are, therefore, difficulties met with when the two are heated together, the steel being liable to run and become injured before the iron is hot enough to weld. By our improvement the steel is kept back while the iron is heating up, and by the time the iron is up to the welding heat, ranging from a cherry-red to a white heat, the steel will also be up to the welding heat without attaining the same temperature as the iron.

By our improvement this last-stated operation is rendered practical by so arranging the sides of the mass that, as soon as the scrap-steel contained within the sides has softened down, one of the sides will follow close onto the melted scrap, and thereby avoid the presence of any air-spaces, which, if left, will cause what is technically termed a "cold-shut," and, after the rolling operation, show an imperfect weld in the bar.

In practicing our invention we proceed as follows: Take Bessemer scrap-steel, such as old railroad-rails and other like scrap, and place it within a loose casing composed of four sides or plates of muck-bar iron of about three-quarters of an inch in thickness, each side being about four inches in width, and one of these plates being free to follow down upon the scrap-steel; for as the steel softens, it occupies a less space. This is caused by the impossibility of packing the whole interior space with the steel, there being left with the most careful packing interstices which, in the aggregate, form quite a space, and which is highly detrimental if the sides or plates of the casing are jointed or in any other manner retained together at the joints, so as not to be permitted to follow down after the softened steel. After the mass is secured together by bands, or in any other convenient way, in order to hold it together until it is inserted in the furnace for the heat, we place it in the furnace, and after it has been brought up to the welding heat of the exterior casing of iron we place the mass in the rolls and roll it into a bar. If the corners of the casing were constructed with a joint, so that one of the sides or plates could not follow down after the softened steel, a space would be left through the bar which would admit of the passage of air, thus cooling the interior of the metal before it is rolled, and injuring it for after use in the manufacture of rods, wire, &c.

The pile is so constructed that the top plate A (shown in the accompanying drawing) can follow up the shrinkage of the steel B B as it becomes softened by the heat. The top plate A is narrow enough to pass down between the plates C C and exclude the air entirely from the steel, both in the furnace and when being carried from the furnace to the rolls.

If, after the first time it has been passed through the rolls, the bar is cut across, the steel and iron can be distinguished from each other, the steel in the center and the iron surrounding it. After the second and subsequent passages through the rolls the steel and iron cannot be separately distinguished in the cross-section of the bar, the crystalline appearance of the steel having disappeared, and the whole mass showing the fibrous character of a very fine quality of iron. This resulting iron can be rolled into rods, and then drawn down into very fine wire of a superior quality.

We claim—

As an improvement in the mode of utilizing old and worn Bessemer-steel rails and fag ends, or other scrap of Bessemer steel, preparing said scrap for the furnace and the rolls by inclosing it within a case composed of four plates of muck-iron so joined to each other at the edges that one of them shall follow down close on the scrap, as the bulk of the latter contracts in softening during the operation of heating, substantially as described.

PETER HAYDEN.
WILLIAM B. HAYDEN.

Witnesses as to signature of Peter Hayden:
K. NEWELL,
JAMES H. HUNTER.

Witnesses as to signature of William B. Hayden:
JOHN H. MARTIN,
GEORGE J. ATKINSON.